Patented Feb. 28, 1933

1,899,120

UNITED STATES PATENT OFFICE

ARTHUR W. SLOAN, OF AKRON, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.  Application filed March 27, 1931. Serial No. 525,870.

This invention relates to the preservation of rubber, and particularly to the preparation of rubber compositions which resist the deterioration due to aging or to exposure to the atmosphere. It has long been known that such deterioration can be greatly retarded by treating the rubber either before or after vulcanization with certain substances known as age-resisters or anti-oxidants. The chief object of this invention, then, is to provide a new and superior class of anti-oxidants for rubber.

The substances which are employed as anti-oxidants according to this invention are all tertiary aminophenols. The preferred compounds are those in which the two hydrogens of the amino group are substituted by alkyl groups.

For example, the following substances are typical members of the class of anti-oxidants outlined above: dimethyl p-aminophenol, dimethyl m-aminophenol, diethyl p-aminophenol, diethyl m-aminophenol, dipropyl p-aminophenol, dibutyl p-aminophenol, di-isopropyl p-aminophenol, di-isobutyl p-aminophenol, dibenzyl p-aminophenol, methyl ethyl p-aminophenol, methyl benzyl p-aminophenol, methyl phenyl p-aminophenol, dimethyl aminocresol, dimethyl aminonaphthol, dimethylamino hydroxy biphenyl, tetramethyl diaminophenol, dimethylamino hydroquinone, dimethylamino guaiacol, p,p'dihydroxy diphenyl methylamine, etc.

Any one or a mixture of several of the above-enumerated substances or of other equivalent substances falling within the same class may be incorporated into rubber with good effect on its age-resisting properties. For example from ¼ to 5% of such an anti-oxidant may be mixed with the rubber before vulcanization, the anti-oxidant having substantially no accelerating effect and therefore ordinarily not necessitating an adjustment of vulcanizing conditions. Alternately, the anti-oxidant may be applied to the surface of crude or vulcanized rubber, say in the form of a powder, paste, or solution. Rubber so treated resists the deteriorating influence of age and exposure to the elements far better than similar untreated rubber.

As a specific example of one embodiment of the method of this invention, a typical tire tread composition was prepared containing: blended plantation rubbers approximately 100 parts by weight, sulfur, 5.5 parts, zinc oxide 30 parts, gas black 40 parts, mineral rubber 10 parts, palm oil 5 parts, and hexamethylene tetramine 0.75 parts. This was divided into portions to certain of which were added 0.95 parts (0.5% of the weight of the composition) of one of the above described anti-oxidants, other portions being used as controls. The compositions were thoroughly mixed, and vulcanized in a press for 45 minutes at 145° C. (249° F.) to produce an optimum cure. The relative rates of aging the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. The results of the tests are given in the appended table, in which T indicates ultimate tensile strength in pounds per sq. in. and E indicates ultimate elongation in per cent. of original length.

Aging tests

| Anti-oxidant | Before aging | | After 7 days in the Geer oven | | After 48 hours in Bierer-Davis bomb | |
|---|---|---|---|---|---|---|
| | T | E | T | E | T | E |
| None (control) | 3770 | 597 | 2252 | 437 | 950 | 337 |
| Dimethyl p-aminophenol | 3892 | 620 | 3171 | 545 | 2602 | 573 |
| None (control) | 3940 | 607 | 2077 | 442 | 950 | 337 |
| Dimethyl m-aminophenol | 4052 | 643 | 2502 | 503 | 1752 | 497 |
| None (control) | 3916 | 683 | 2025 | 510 | | |
| Diethyl m-aminophenol | 3795 | 677 | 2243 | 533 | | |

It is evident from the above examples that rubber compositions containing even small proportions of the anti-oxidants of this invention resist deterioration far more effectively than the similar untreated compositions.

Obviously, the practice of this invention is not limited to the specific compositions given above, such compositions being merely illustrative of one manner of employing the anti-oxidants of this invention. The anti-oxidants may be employed in conjunction with other known anti-oxidants, or with other vulcanizing agents than those here specifically disclosed. The proportions of the constituents may be varied, or other substances may be substituted generally therefor, since this invention is applicable to pure rubber or rubber compositions of the most varied nature. The anti-oxidants may also be applied to unvulcanized or vulcanized rubber with good effect on the age-resisting properties of the rubber, such as by applying them to the surface of the rubber, as for example in solution, or in the form of a paste or emulsion. It is therefore to be understood that the term "treating" as employed in the appended claims is used in a generic sense to include either the incorporation of the anti-oxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments, vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a tertiary aminophenol.
2. The method of preserving rubber which comprises treating rubber with a dialkyl aminophenol.
3. The method of preserving rubber which comprises treating rubber with a dialkyl amino hydroxy benzene.
4. The method of preserving rubber which comprises treating rubber with a dialkyl p-aminophenol.
5. The method of preserving rubber which comprises treating rubber with a dialkyl m-aminophenol.
6. The method of preserving rubber which comprises treating rubber with a dialkyl aminophenol in which the alkyl groups are straight chain hydrocarbon groups.
7. The method of preserving rubber which comprises vulcanizing rubber in the presence of a dialkyl aminophenol.
8. A composition comprising rubber and a tertiary aminophenol.
9. A composition comprising rubber and a dialkyl aminophenol.
10. A composition comprising rubber and a dialkyl amino hydroxy benzene.
11. A composition comprising rubber and a dialkyl p-aminophenol.
12. A composition comprising rubber and a dialkyl m-aminophenol.
13. A composition comprising rubber and a dialkyl aminophenol in which the alkyl groups are straight chain hydrocarbon groups.
14. A rubber composition which has been vulcanized in the presence of a dialkyl aminophenol.
15. The method of preserving rubber which comprises treating rubber with dimethyl p-aminophenol.
16. The method of preserving rubber which comprises treating rubber with dimethyl m-aminophenol.
17. The method of preserving rubber which comprises treating rubber with diethyl p-aminophenol.
18. A composition comprising rubber and dimethyl p-aminophenol.
19. A composition comprising rubber and dimethyl m-aminophenol.
20. A composition comprising rubber and diethyl p-aminophenol.

In witness whereof I have hereunto set my hand this 23rd day of March, 1931.

ARTHUR W. SLOAN.